United States Patent Office 3,200,444
Patented Aug. 17, 1965

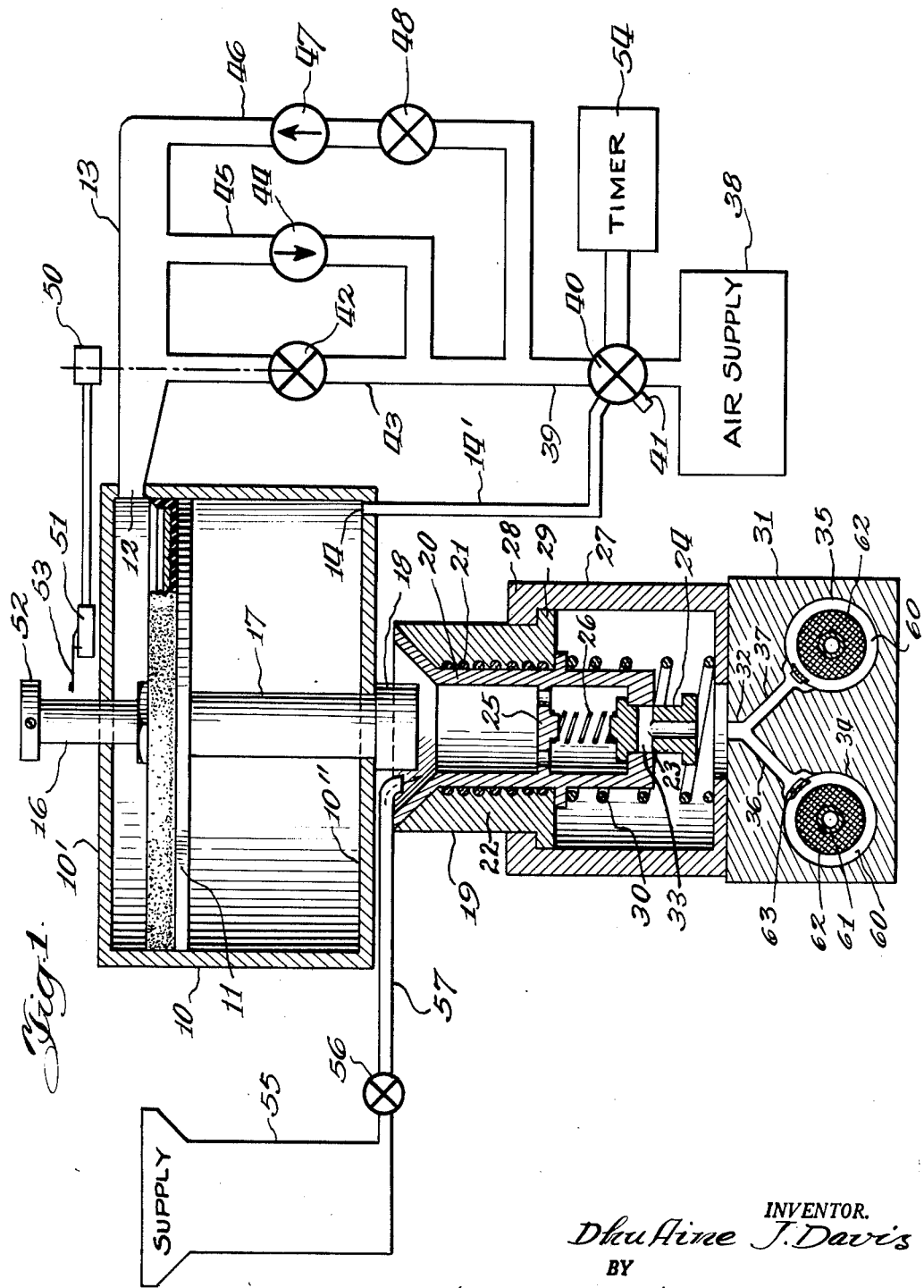

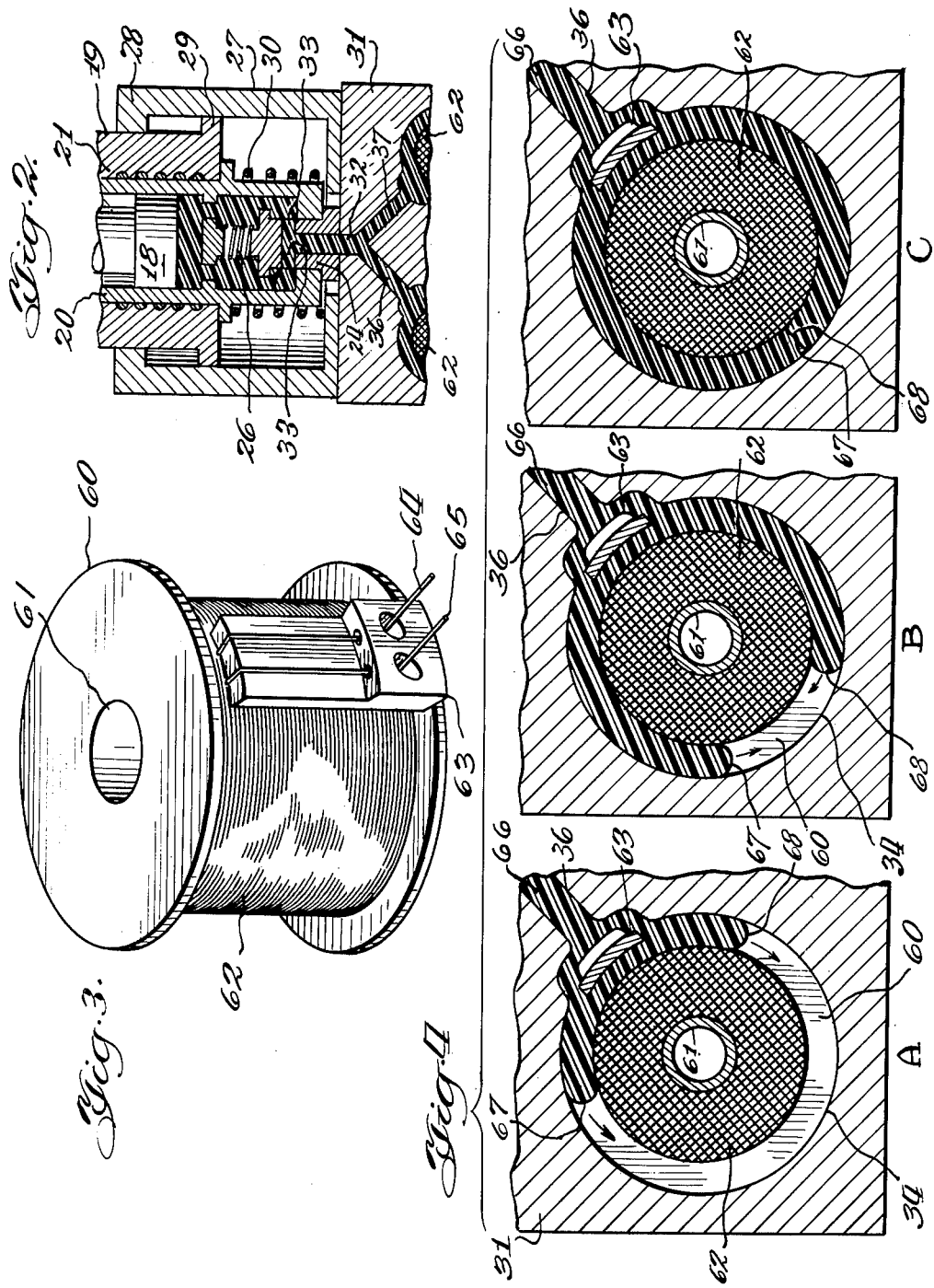

3,200,444
TWO STAGE INJECTION MOLDING APPA-
RATUS FOR ENCAPSULATING DEFORM-
ABLE ARTICLES
DhuAine J. Davis, % D. J. Davis Co. Inc.,
303 Delles Road, Wheaton, Ill.
Filed June 1, 1962, Ser. No. 199,348
3 Claims. (Cl. 18—30)

This invention relates to a molding apparatus and more specifically to a slush-injection molding apparatus for encapsulating deformable articles.

There are generally two types of apparatus used to form a plastic material about an article to be encapsulated. One, the injection type, provides a means for forcing material in a fluid state under pressure into a mold in which the article to be encapsulated is held. In this type of apparatus considerable pressure is exerted upon the article and often times damage results or tolerances on the article are not held.

The other type of encapsulating apparatus is the slush-type molding process in which the article to be covered with plastic is placed in a mold and material in a fluid state is poured into the mold until the article is completely covered. In this type of molding the seal between the plastic which is poured into the mold and the article to be encapsulated is often times faulty, and thus subjects the article to the effects of humidity, vibration and leakage.

It is therefore an object of this invention to provide an apparatus which combines the injection and slush molding processes.

It is a further object of this invention to provide a molding apparatus for encapsulating deformable articles without subjecting the members to mechanical strains.

It is still a further object of this invention to provide a molding apparatus which provides a humidity and liquid seal about a deformable member without effecting the tolerances and dimensions of the deformable member.

Accordingly, one feature of the invention is to provide a molding apparatus for molding a material to a deformable article comprising means including a chamber for placing material in a plastic state, and a mold for containing a deformable article. There is further included means including a pressure system for forcing said material in a plastic state from the chamber into the mold and means operable as a function of the amount of material forced into the mold for reducing the pressure in the pressure system.

Yet another feature of the invention is to provide in a molding apparatus a pressure system for forcing material in a plastic state into a mold containing a deformable article under a first pressure and at a decreased second pressure.

It is still another feature of this invention to provide in a molding apparatus an air pressure system for forcing material in a plastic state into a mold containing a deformable article under a first substantially constant pressure and a decreased second pressure down to a predetermined minimum pressure.

Other features and advantages will become apparent from the following detailed description taken in connection with the accompanying drawings in which like reference numerals refer to like elements and in which:

FIGURE 1 is a schematic drawing partially in cross section of one embodiment of the invention;

FIGURE 2 is a cross sectional view of the valve of FIGURE 1;

FIGURE 3 is a drawing of a deformable article; and

FIGURE 4 is a cross sectional view of a deformable article in a mold and shows three phases of the encapsulation of the article.

Referring now to FIGURES 1 and 2, there is provided a cylinder 10 having end walls 10', 10" and a piston 11 actuable by air pressure received through a port 12 from a manifold 13 and return to the upper position by air admitted through a port 14. A pair of shafts 16, 17 connected to piston 11, extend through the end walls 10' and 10" respectively of the cylinder 10. Coupled to the end of shaft 17 is a ram 18 adapted to be forced into a heating chamber 19.

The heating chamber 19 consists of an inner cylindrical member 20, a heating element 21 and a surrounding layer of insulating material 22. The upper end of member 20 is formed in a conical shape for receiving granules of plastic material and the lower end has an aperture 23 holding a valve member 24. A plate 25 is held in member 20 and a spring 26 under compression between plate 25 and valve 24 keeps the valve closed except during portions of the operating cycle.

A frame member 27 has an inwardly projecting upper end 28 which engages a projection 29 on the heating chamber 19 when the heating chamber is in its uppermost position under the urging of a spring 30.

A mold 31 is held against the lower end of frame member 27 with a port 32 axially aligned to engage a passage 33 in valve 24. A pair of molding chambers 34 and 35 are shown joined to port 32 by a pair of connecting passageways 36 and 37.

An air supply 38 is coupled to a feed line 39 having an air valve 40 therein which includes a venting port 41 and to feed line 14'. A two-way solenoid actuated valve 42 connected in a line 43 joined to air line 39 connects to manifold 13 and provides air to actuate piston 11 through port 12. A check valve 44 is connected in a line 45 bypassing the pressure valve 42 and evacuates air from port 12 through vent 41 when valve 40 is in the exhaust position. Additionally, there is provided a safety line 46 including a check valve 47 and a pressure regulator or reducer 48 coupled between manifold 13 and air line 39. Pressure valve 42 is shown connected by a dashed line 49 to a solenoid 50 which is electrically connected to a microswitch 51. A collar 52 adjustably held on shaft 16 actuates microswitch 51 upon downward movement of the piston when it engages contact arm 53 and solenoid 50 is actuated to shut off the air pressure valve.

A timer 54 shown coupled to air valve 22 performs the operation of cycling the molding apparatus.

A supply hopper 55 of molding material is provided for charging the heating chamber through a feed valve 56 and feed pipe 57 disposed above the conical end of heating chamber 19. Normally, the material is maintained in the hopper in granulated form and after it is fed to the chamber 20 application of heat and high pressure changes these granules into a plastic state usable in the mold to encapsulate the articles. The high pressure further acts to flow the plastic material rapidly into the mold and prevents "setting" within the passageways. However, it is desirable to prevent the high pressure from being transmitted to the deformable article through the plastic material, and this is accomplished by reducing the pressure during the last portion of the encapsulation. Thus, there is provided a high speed molding apparatus which does not damage or deform articles encased in plastic.

The operation of the molding apparatus is as follows. Timer 54 actuates feed valve 56 and the heating chamber 19 is charged with granulated plastic material, as nylon, from supply hopper 55. Then the pressure valve 40 is actuated supplying air under pressure to the upper portion of cylinder 10 and acting against piston 11 forcing it in a downward direction. Heating element 21 in conjunction with the applied pressure changes the granulated material to a plastic state and ram 18 enters the member 20 forcing out trapped air and reducing the granule size so that the nylon is properly reduced to the plastic state.

As ram 18 moves downwardly in the cylindrical portion of the member 20, the force of spring 30 is overcome and the entire heating chamber 19 moves axially in a downward direction. When the face of valve 24 engages mold 31, valve 24 moves in a relatively upward direction with respect to the descending heating chamber 19. The aperture 33 rises above the lower lip of the member 20, and plastic material is forced through the aperture 33, the port 32 and connecting apertures 36, 37 into the molding chambers 34, 35. The ram continues to descend until a substantial portion, as eighty to ninety percent, of the plastic material needed has been admitted into the chambers 34, 35. At this time collar 52 engages contact arm 53 of switch 51 and actuates solenoid 50 to close the pressure valve 42.

As there is still air under pressure in the upper portion of cylinder 10 the piston continues to descend under the urging of the expanding air, the pressure of which continuously reduces. An additional amount of heated plastic material is forced into molding chambers 34, 35 under the urging of ram 18 and completely seals the article being encapsulated.

Timer 54 then actuates the air valve 40 venting line 39 to atmospheric pressure and check valve 44 opens releasing the remaining air under pressure confined in the upper portion of cylinder 10. Air is admitted through port 14 forcing the piston 11 upward and withdraws the ram from the cylindrical portion of member 20. Spring 30 expands forcing the heating chamber in the upward direction until stopped by the mating of members 28, 29. Valve 24 is forced downward by spring 26 and the apertures 33 are sealed with respect to the chamber 20.

In the event that the air pressure above the piston 11 drops below a predetermined amount during the injection of the material, check valve 47 is actuated and pressure reducer 48 allows air pressure into the piston at a predetermined low pressure and completion of a cycle of operation is insured.

FIGURE 3 shows one form of a deformable article, in this case a coil wound upon a bobbin which may be encapsulated using the method and apparatus of this disclosure. It includes bobbin 60 having a center shaft 61 about which is wound a coil of wire 62. A connector plate 63 is provided with a pair of leads 64, 65 which are brought up and over the top of connector plate 63 and fastened to the leads of coils 62. Bobbin 60, shaft 61 and connector plate 63 are formed of a plastic material.

FIGURE 4, having three views A, B and C, shows sections of mold 31 during successive steps of the encapsulation. The views are sections of the molding chamber 34 shown in FIGURE 1 taken substantially along a plane half way between the top and bottom of the mold. In each of the three views of FIGURE 2 is shown in the chamber and includes shaft 61, bobbin 60 and coil 62. The mold serves to hold the connector plate 63 in proper alignment with the bobbin. It is to be noted that the connections between the leads 64, 65 and the coil 62 are made prior to insertion in the mold.

In FIGURE 4A nylon 66 is shown flowing in a plastic state into the mold through channel 36. The leading edges 67 and 68 of the plastic material are shown and about ⅓ of the open space within the mold has been filled with plastic.

FIGURE 4B shows the leading edges 67, 68 of the plastic material positioned in the mold filling approximately eighty to ninety percent of the open volume within the mold. The connector plate 63 is completely surrounded by the plastic material and at this time the microswitch 51 shown in FIGURE 1 is actuated to shut the pressure valve 42.

FIGURE 4C shows the two leading edges 67 and 68 of the nylon uniting to form a knit line in the plastic material, and at this time the entire cavity of the mold around the coil is filled with material. In the embodiment of the invention shown a slight pressure is exerted within the mold as the result of the ram 18 continuing to descend under some pressure and a complete seal is formed along the knit line and the junctions of the plastic material with the bobbin and connector plate. At this time the timer 54 shown in FIGURE 1 is actuated and the ram is withdrawn from the heating chamber removing all pressure on the plastic material.

Although the embodiment has been discussed using air under pressure as the activating mechanism it is to be understood that a hydraulic system could be used with proper changes being made in the pressure regulating valves.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. An injection molding apparatus, comprising: a mold having a cavity for a deformable article to which a thermoplastic material is to be molded; a source of liquid thermoplastic material; a movable ram; a pneumatic piston and cylinder device connected with said ram, moving the same with relation to said material source and said mold to force plastic material from the source into said mold, the quantity of material forced into the mold being a function of the position of said ram; a source of air under pressure for operating said piston and cylinder device; valve means controlling the air from said source to said piston and cylinder and having an open condition in which said piston and cylinder device is actuated by said air at a first air pressure; and control means, connected with said valve means, and responsive to the position of said ram, actuated when the quantity of material in said mold is less than sufficient to fill the mold, to close said valve, the air under pressure in said cylinder expanding to force additional material into the mold at a pressure less than said first pressure.

2. The molding apparatus of claim 1 wherein a check valve is connected in parallel with said valve to vent said piston and cylinder device.

3. The molding apparatus of claim 1 including a check valve and pressure reducer connected in parallel with said valve to maintain a minimum pressure in said piston and cylinder device.

References Cited by the Examiner

UNITED STATES PATENTS

| 2,627,630 | 2/53 | Farley | 18—30 |
|---|---|---|---|
| 2,671,246 | 3/54 | Lester | 18—30 |
| 2,684,504 | 7/54 | Sell | 18—59 |
| 2,763,032 | 9/56 | Fay | 18—59 |
| 2,834,050 | 5/58 | Dymsza et al. | 18—30 |
| 3,072,967 | 1/63 | Mathews et al. | 18—36 |
| 3,084,390 | 4/63 | Anderson | 18—36 |
| 3,089,199 | 5/63 | Halacsy | 264—272 XR |
| 3,132,196 | 5/64 | Veatch | 264—272 |

WILLIAM J. STEPHENSON, *Primary Examiner.*

MORRIS LIEBMAN, MICHAEL V. BRINDISI,
*Examiners.*